US007797625B1

(12) United States Patent
Wallar, II (10) Patent No.: US 7,797,625 B1
(45) Date of Patent: Sep. 14, 2010

(54) MESSAGE COMPOSITION COMPUTER, MEMORY MEDIA AND METHOD

(75) Inventor: Donald E. Wallar, II, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 09/471,429

(22) Filed: Dec. 23, 1999

(51) Int. Cl.
*G06F 17/00* (2006.01)
(52) U.S. Cl. ...................... 715/249; 715/234
(58) Field of Classification Search ............. 715/513, 715/523, 524, 526, 234, 235, 236, 237, 249, 715/250, 273; 709/206, 246; 345/764
See application file for complete search history.

(56) References Cited

U.S. PATENT DOCUMENTS

| 5,283,887 | A | * | 2/1994 | Zachery ................ 715/513 |
| 5,287,444 | A | | 2/1994 | Enescu et al. ............ 715/507 |
| 5,629,846 | A | * | 5/1997 | Crapo .................. 708/705 |
| 5,706,434 | A | * | 1/1998 | Kremen et al. .......... 709/218 |
| 5,848,415 | A | * | 12/1998 | Guck .................. 707/10 |
| 5,911,776 | A | * | 6/1999 | Guck .................. 709/217 |
| 6,038,573 | A | * | 3/2000 | Parks .................. 715/513 |
| 6,202,072 | B1 | * | 3/2001 | Kuwahara ............... 715/513 |
| 6,230,173 | B1 | * | 5/2001 | Ferrel et al. ............. 715/513 |
| 6,339,780 | B1 | * | 1/2002 | Shell et al. ............. 715/526 |
| 6,350,066 | B1 | * | 2/2002 | Bobo, II ............... 709/206 |
| 6,377,956 | B1 | * | 4/2002 | Hsu et al. ............. 707/104.1 |
| 6,629,130 | B2 | * | 9/2003 | Mertama et al. .......... 709/206 |

OTHER PUBLICATIONS

Hunka, George, "Late Night Netscape Communicator 4.0", 1997, Macmillan Computer Publishing, pp. 281-287.*
Miller et al., "Internet Explorer Virtuoso",1997, MIS:Press, Inc., 2nd Edition, pp. 254-255.*
"Microsoft Office 2000 Complete", 1999, Sybex, Inc., pp. 610-612.*
SPI, May 11, 1999, pp. 1-2, "Record Display".
VAX Professional, Apr. 1988, vol. 10, No. 2, pp. 27-29, Terence A. Robb, "VMS Message Utility".
Kavi et al., "*Message Repository Definitional Facility: An Architectural Model for Interprocess Communication*", IEEE, 1984, pp. 271-278.

* cited by examiner

*Primary Examiner*—Laurie Ries
(74) *Attorney, Agent, or Firm*—Ohlandt, Greeley, Ruggiero & Perle, L.L.P.; Ingrid Foerster, Esq.

(57) ABSTRACT

A method and program for composing computer messages in formats, such as SGML, book manager script or an formatted display. The method enables the composer to compose the computer message without any special knowledge of the format tags and rules for the formats. The composer enters the messages in a template on a web page and the program converts the unformatted messages to messages in a format selected by the composer. The composer can then copy the formatted message to a computer message file or to any other file or application.

27 Claims, 8 Drawing Sheets

Select Output Type: [BookManager]

Create: Click on the following button to create the completed message in the box below. This will collect and merge all the information you have entered in fields above. If you need help with some additional tags or display formatting, use SGML Help.

[ Create Complete Message ] — 86

```
. *Wallar, 08/30/1999
:msgnum>DSNZ999I
:msg. Here is some sample text. In the Messages and Codes
book for DB2, this text would give a Textual Representation
of what the above number indicates... (i.e., The system is
not able to process your information)
: xpl.Here is where the explanation of the Message Text
would be displayed....(i.e., You did not enter the proper
key word and the system halted)
: severity. This is where the Severity Code would go...(i.e.,
4 (warning) )
: sysact.This is where the action that the system completes
would go...(i.e. System restarts)
:oresp.Not all the fields have to be filled in. The
application can determine when to add tagging and when a
field should be omitted
```
82

Fig. 4

Select Output Type: [Display Format]

Create: Click on the following button to create the completed message in the box below. This will collect and merge all the information you have entered in fields above. If you need help with some additional tags or display formatting, use SGML Help.

[ Create Complete Message ] — 86

```
DSNZ9991    Here is some sample text. In the Messages
            and Codes book for DB2, this text would
            give a Textual Representation of what
            the above number indicates... (i.e.,
            The system is not able to process your
            information)

Explanation: Here is where the explanation of the Message
Text would be displayed....(i.e., You did not enter the
proper key word and the system halted)

Severity: This is where the Severity Code would go...(i.e.,
4 (warning) )

System Action: This is where the action that the system
completes would go...(i.e. System restarts)

Operator Response: Not all the fields have to be filled in.
The application can determine when to add tagging and when a
field should be omitted
```
— 82

MESSAGE COMPOSITION COMPUTER, MEMORY MEDIA AND METHOD

FIELD OF THE INVENTION

This invention relates to the composition of messages for a computer. In particular, the invention provides a message creator program for a computer, a memory media for the program and a method of composing computer messages.

DESCRIPTION OF THE ART

Programs running on computers must communicate information to a user of the computer and to other programs. Large programs, such as operating systems and applications, create a large number of messages that must be communicated to a system operator or to a user.

Some of these messages may simply be informative messages, such as informing a user that an action has been completed or a resource is now available. Other messages warn or alert a user that something is not as expected, such as a file is not in an expected format. Still other messages inform the user of an error or failure, such as an attempt to open file that does not exist.

Such computer messages are composed by computer program designers and stored in a computer message file. When an operating event occurs that requires a certain message, the required message is accessed from the computer message file and communicated visually or orally to the user.

The computer messages are stored in the computer message file in a particular format with format tags that indicate various format issues, such as field delimiters, message types, message identity, message composer identity and the like. Two formats that have been used are book manager script and Standard Generalized Markup Language (SGML). Book manager script and SGML require different format tags. The composition of a message in either of these formats requires the composer to have a special knowledge of the formats. Even with this special knowledge, considerable time is required to accurately insert the format tags. This often results in errors in the formatted message.

Message processing procedures for the generation of informative messages are known. For example, U.S. Pat. No. 5,287,444 discloses a message generation procedure for presenting a message in a selected national language. The procedure processes a formatted message with the syntax of the selected national language to produce the message in such language. However, this procedure does not alleviate the burdens of forming a formatted message with format tags.

Another example of a known message utility is described in an article entitled *VMS Message Utility*, The Software journal for VMS, April, 1988, at pages 27 through 29. This utility converts a message written in source code with format tags to a VMS message format. However, the message composer is still burdened with having to write the message in source code with embedded format tags.

Accordingly, there is a need for a message composition tool that relieves a message composer of the time consuming burden of preparing a formatted computer message with format tags, that reduces errors, and that saves time in composition of messages.

SUMMARY OF THE INVENTION

The method of the present invention allows a user to compose a computer message in either SGML, book manager script or formatted display without any special knowledge of the format tags and rules. The method presents on a display monitor a message composition area, a message selector and a formatted message display area. The message selector includes plural format choices, for example, SGML, book manager script and formatted display. The user enters an unformatted textual message in the message composition area. The message is automatically converted by a message creator program into a selected one of the message formats to form a formatted message with format tags. The formatted message is then displayed in the display area. When two or more messages are entered in the template, the message creator program forms concatenated complete message in the selected format for display in the display area.

The message composition area, message selector and formatted message display area are formed on a template that is presented on a web page using an HTML utility and the message creator program uses a Java script utility to present a Java script/HTML interface to the user.

The computer of the invention employs the message creator program in an interactive manner with the user composer.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF PREFERRED EMBODIMENT

Figure 1:
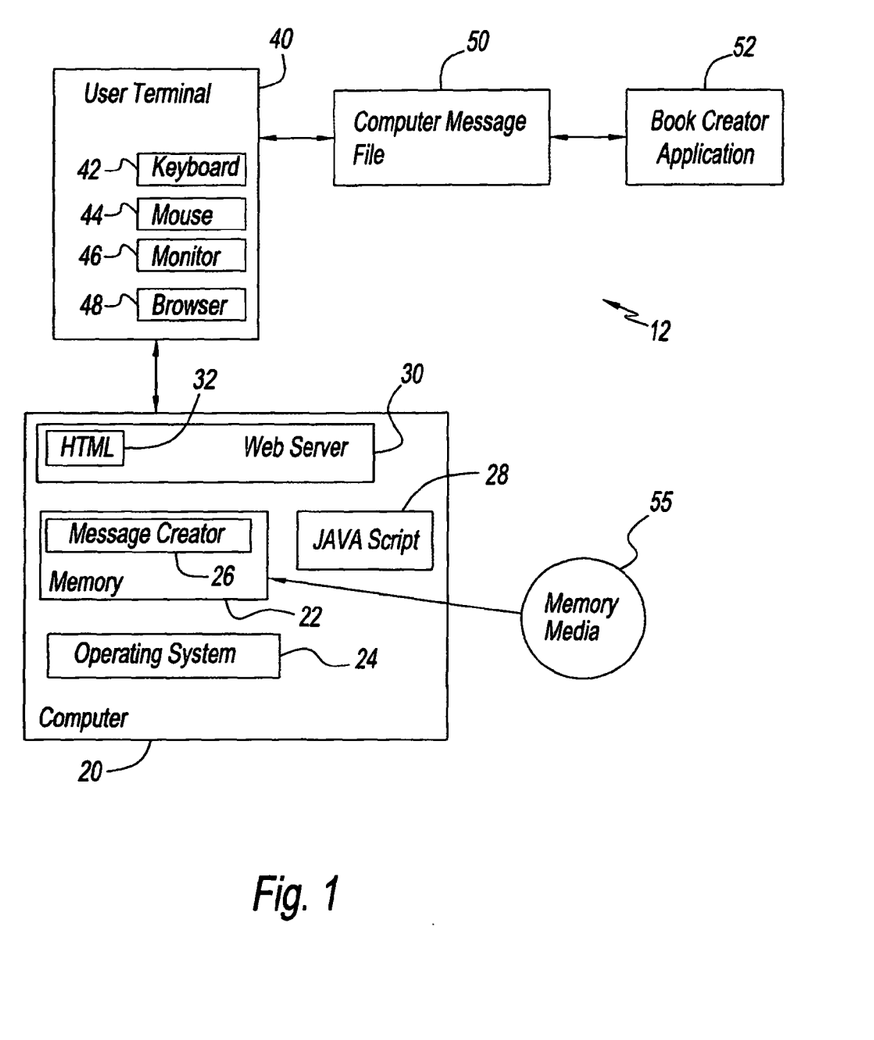
FIG. 1 is a block diagram of a system for creating messages in formats directly usable in book files according to the present invention.

Referring to FIG. 1, a data processing system 12 includes a computer 20, a user terminal 40, a computer message file 50 and a book creator application 52. Computer 20 includes a memory 22, an operating system 24, a Java script utility 28, a message creator program 26 and a web server 30. Message creator program 26 is stored in memory 22. Web server 30 includes an HTML utility to provide web pages to user terminal 40.

User terminal 40 includes a keyboard 42, a mouse 44, a monitor 46 and a browser 40. Browser 40 enables web pages to be accessed from an Intranet or an Internet and viewed on monitor 46. User terminal 20 may suitably be a PC or any other device with a browser and textual input capability.

The actual locations of computer message file 50 and book creator application are unimportant to the present invention. They can be located within user terminal 40, computer 20 or in another computer that communicates with user terminal via an Internet, Intranet or other communication facility.

Web server 30, though shown in FIG. 1 as integrated into computer 20, can alternatively be a separate web server.

A memory media 55 containing message creator program 26 is provided for the purpose of loading message creator program 26 into memory 22.

Figure 2:
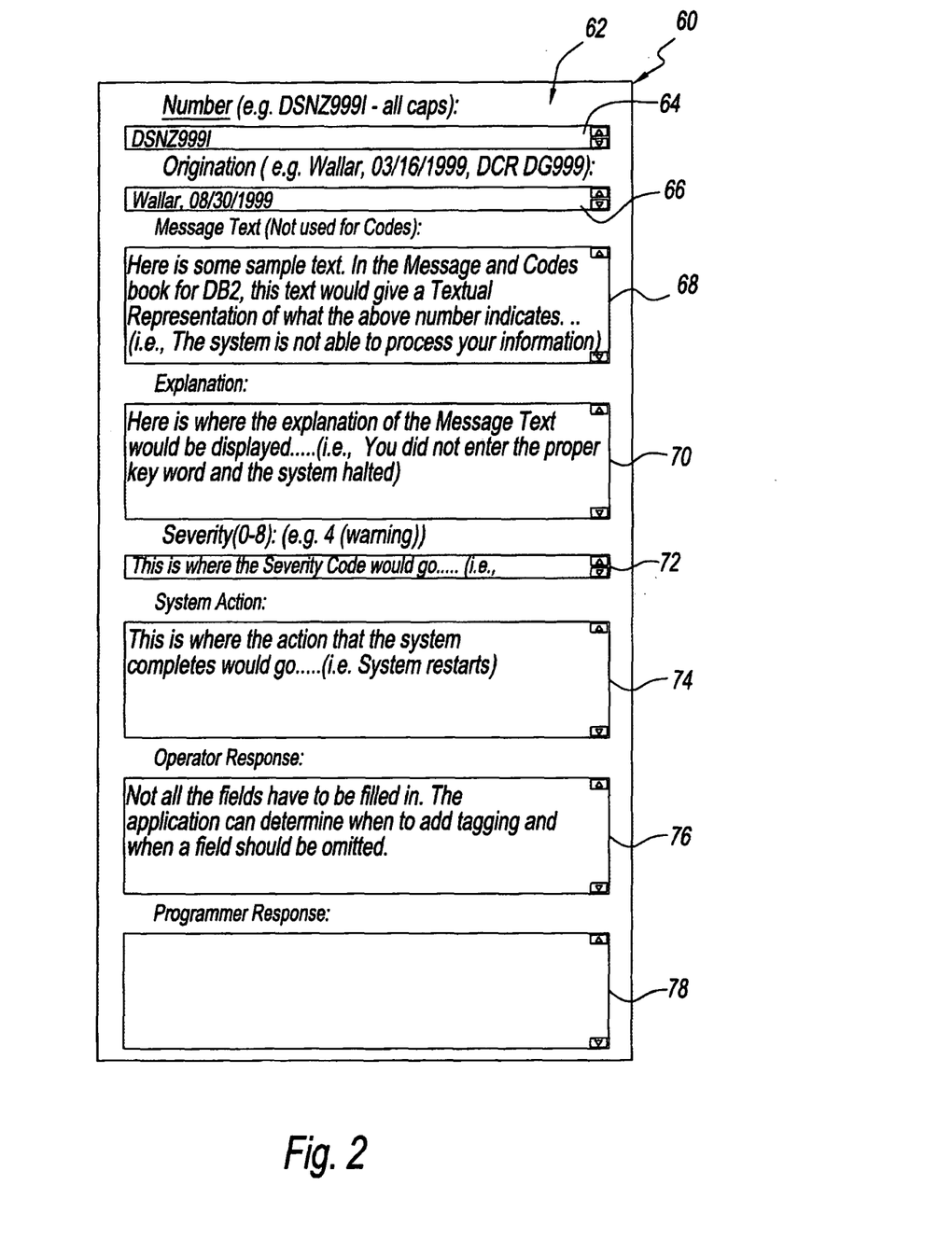
FIGS. 2 and 3 depict a template filled in for composition of an SGML formatted message for the FIG. 1 system.
Figure 3:
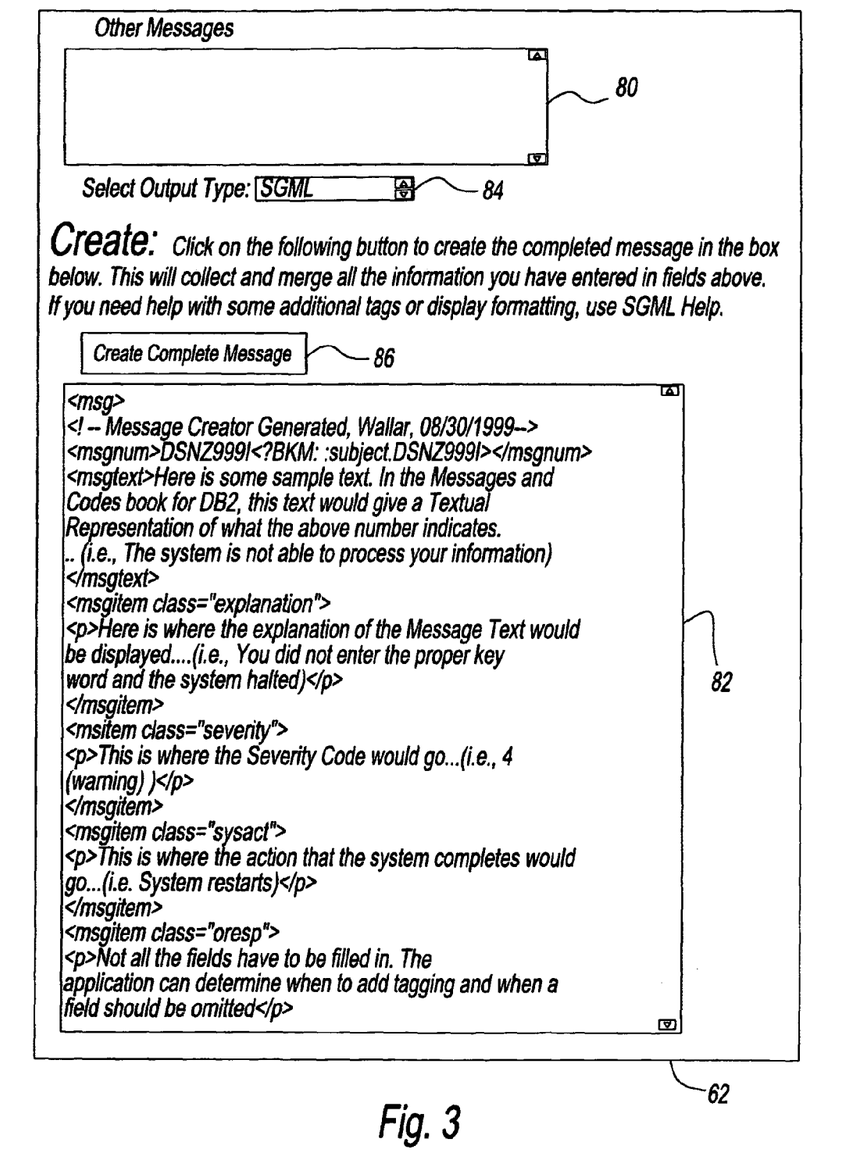

Referring to FIGS. 2 and 3, the method of the present invention presents a web page 60 on monitor 46 of user terminal 40 (FIG. 1). Web page 60 begins on FIG. 2 and continues onto FIG. 3. Web page 60 includes a template 62 that includes a plurality of areas for the formatted message composition process. Exemplary messages are shown entered into several of these areas. To start message entry, the user enters a message number in a message number area 64, the user's name and the date in an originator area 66, a computer message in an unformatted message area 68, an explanation message in an explanation area 70, a severity rating in a severity area 72 and a system action message in a system action area 74.

The exemplary messages have been chosen to illustrate the formatting capability of the invention. More typically, the computer message entered into text area 68 might be a message, such as "Printer Error" and the message entered in explanation area 70 might be "Check Printer Cable".

An operator response area 76 and a programmer response area 78 are used by a system operator and a programmer to provide commentary to the messages entered by the user. The user or others may enter additional messages in an other messages area 80. All of these messages are unformatted and in simple text.

The user selects the format type for the messages from a format selector, shown as a selection box 84. Selection box 84 affords the user the format choices of SGML (shown as selected in FIG. 3), book manager script and formatted display.

To develop the complete formatted message from the messages entered in areas 64, 66, 68, 70, 72, 74 and 76, the user selects the create complete message button 86. This invokes message creator program 26 to convert these messages to a concatenated complete message with format tags for the selected format. The complete formatted message is shown in a complete message display area 82 with SGML format tags.

Figure 4:
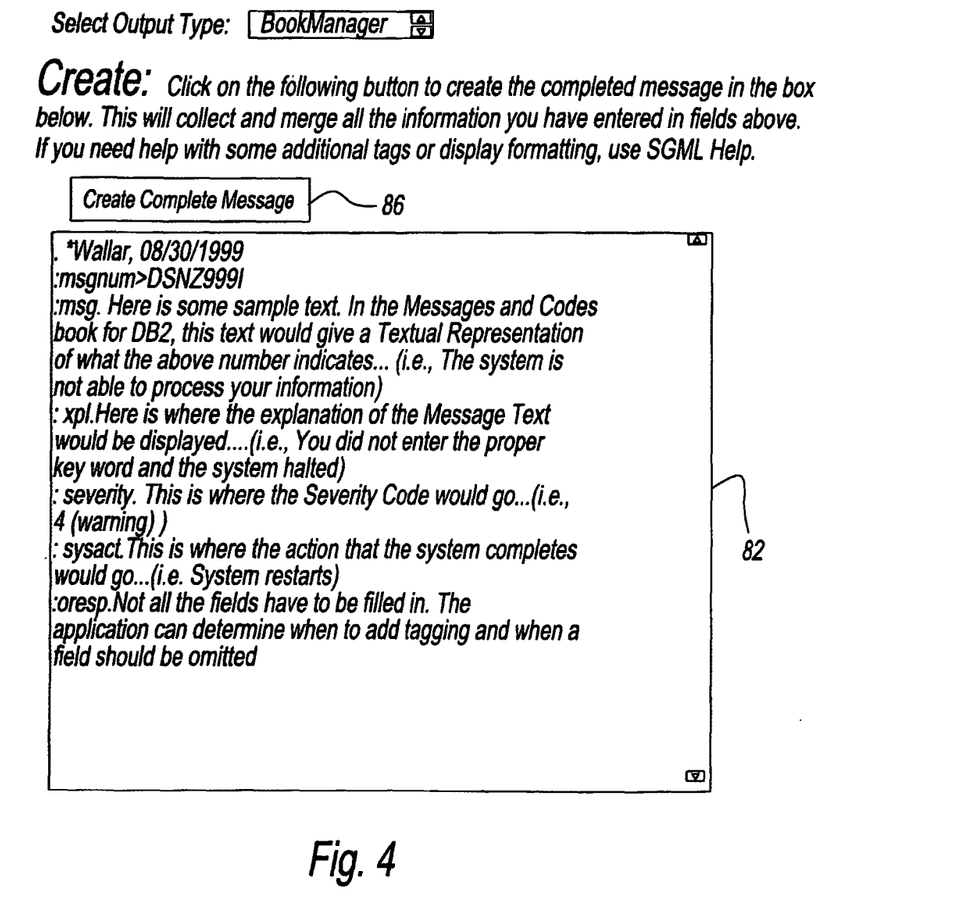
FIG. 4 depicts the complete message display area of the template for a book manager formatted message.
Figure 5:
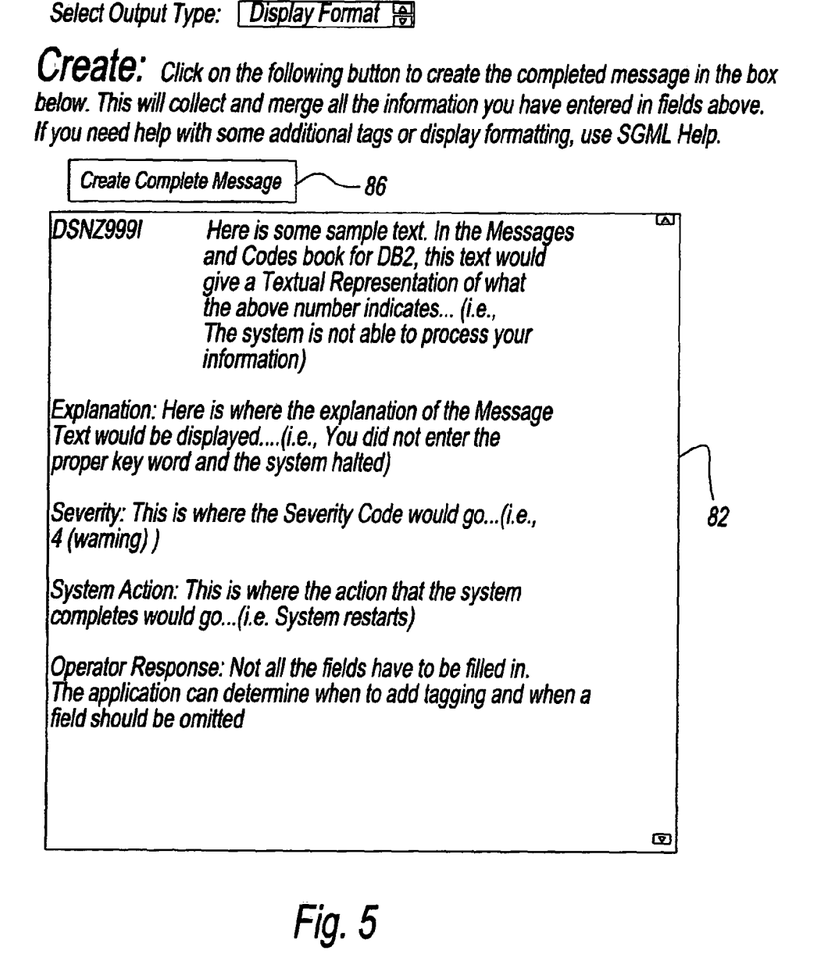
FIG. 5 depicts the complete message display area of the template for a display formatted message.

FIG. 4 shows complete message display area 82 for the same message example in book manager script. FIG. 5 shows complete message display area 82 for the same message example in formatted display. The formatted display choice allows the user to view the complete message as it will appear in the computer message book. By using a feature such as copy and paste or copy or save to a file, the user can use the completed text in a variety of applications other than book creator application 52.

Figure 6:
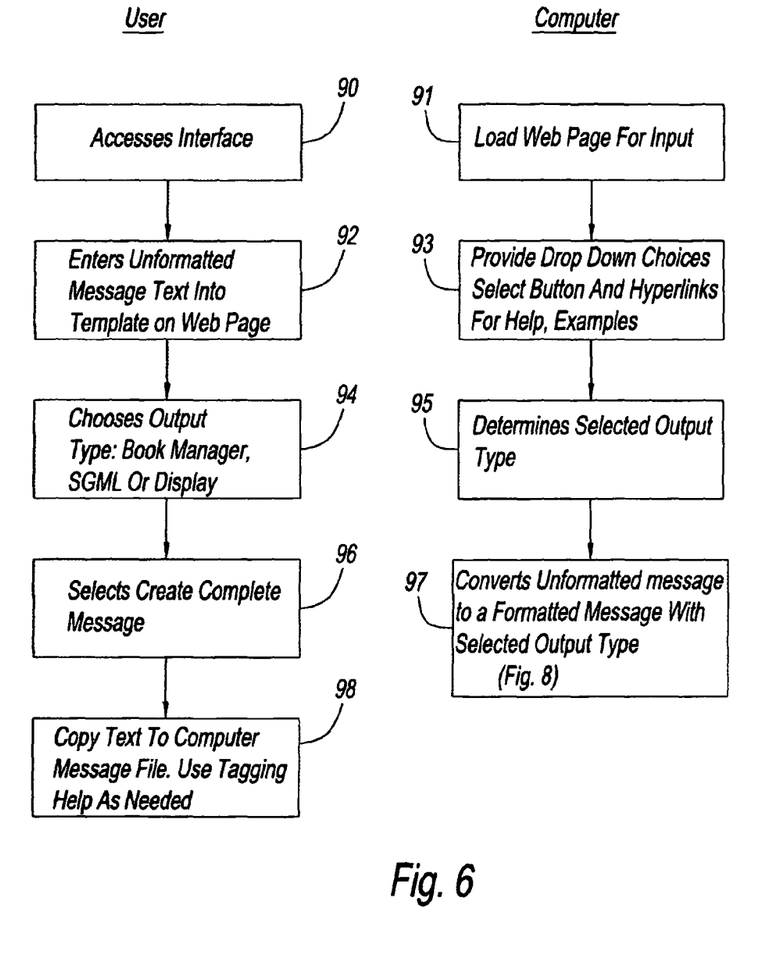
FIG. 6 is a process flow diagram of the process steps of the method of the present invention.

Referring to FIG. 6, the method of the present invention is shown in a flow diagram having a left hand column for activities performed by the user and a right hand column for activities performed by computer 20, under control of message creator program 26. The method begins at step 90 with the user operating user terminal 20 to access web page 60. In step 91, computer 20, acting under the control of message creator program 26, loads web page 60 to web server 30 for presentation to user terminal 40.

In step 92, the user enters unformatted messages in simple text to template 62. In step 93, message creator program 26 provides drop down choices, select buttons and hyperlinks for help and examples. In step 94, the user selects the type of output format for the entered messages by operating selection box selector 84. At step 96, the user selects create complete message button 86 to form the complete message in the selected format.

Message creator program 26 then responds at step 95 to determine the selected format type. At step 97, message creator program 26 then converts the unformatted messages into a formatted complete message with format tags for the selected format. The user at step 98 can copy the formatted complete message to computer message file 50 Book creator application 52 uses the messages in computer message file 50 to create a computer message book. Alternatively, the user can use tag help as needed to edit the message.

Figure 7:
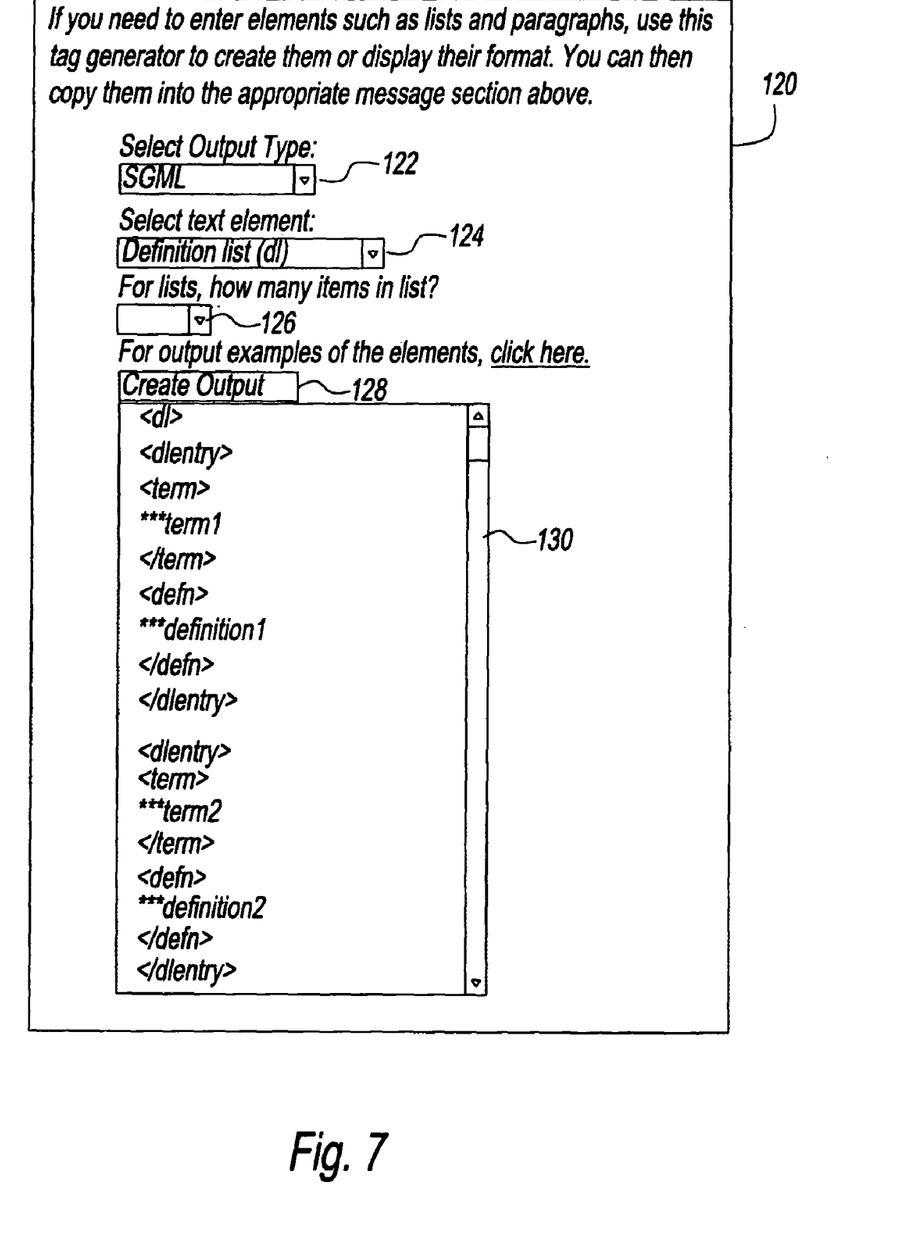
FIG. 7 depicts a tagging help drop down box for the FIG. 1 system.

Referring to FIG. 7, a tag help box 120 is useful if the message is to contain lists or definitions that require special formatting. Tag help box 120 may either be a selectable drop down box or a box contained within template 62. To use tag help 120, the user must select the output format type at select box 122. Also, the user must select at select box 124 the text element from choices such as definition list, ordered list, unordered list and the like. An ordered list, for example, might be ordered numerically, while an unordered list might be identified by bullets. The user must also insert in number box 126 the number of items in the list.

Consider an example where the list is a definitional list as follows:

Apple—Delicious fruit that grows on a tree and comes in a variety of colors.

Banana—Not an apple, but delicious and best when yellow in color.

For this example, the user has selected SGML as the output format, the definition list as the list type and 2 as the number of definitions in the list. The user then activates a create output button 128. A formatted definition list is displayed in display area 130 for editing by the user. The formatted definition list includes variable items, term1 and term2. The user replaces term1 and term2 with apple and banana, respectively. The formatted definition list also includes variable items, definition1 and definition2. The user replaces definition1 and definition2 with the definitions for apple and banana, respectively. The user can then cut the formatted list from display area 130 and paste it into a file, program, or in the complete message area 82.

According to another aspect of the method of the invention, a user can obtain a formatted computer message from computer message file 50, enter it into complete message display area 82 and select the message format type. The user then edits the message. When finished, the user returns the edited message to computer message file 50.

The user can edit the complete formatted message in area 82 at this stage in the process. When the complete formatted message is finished, the user transfers a copy to computer message file 50.

Figure 8:
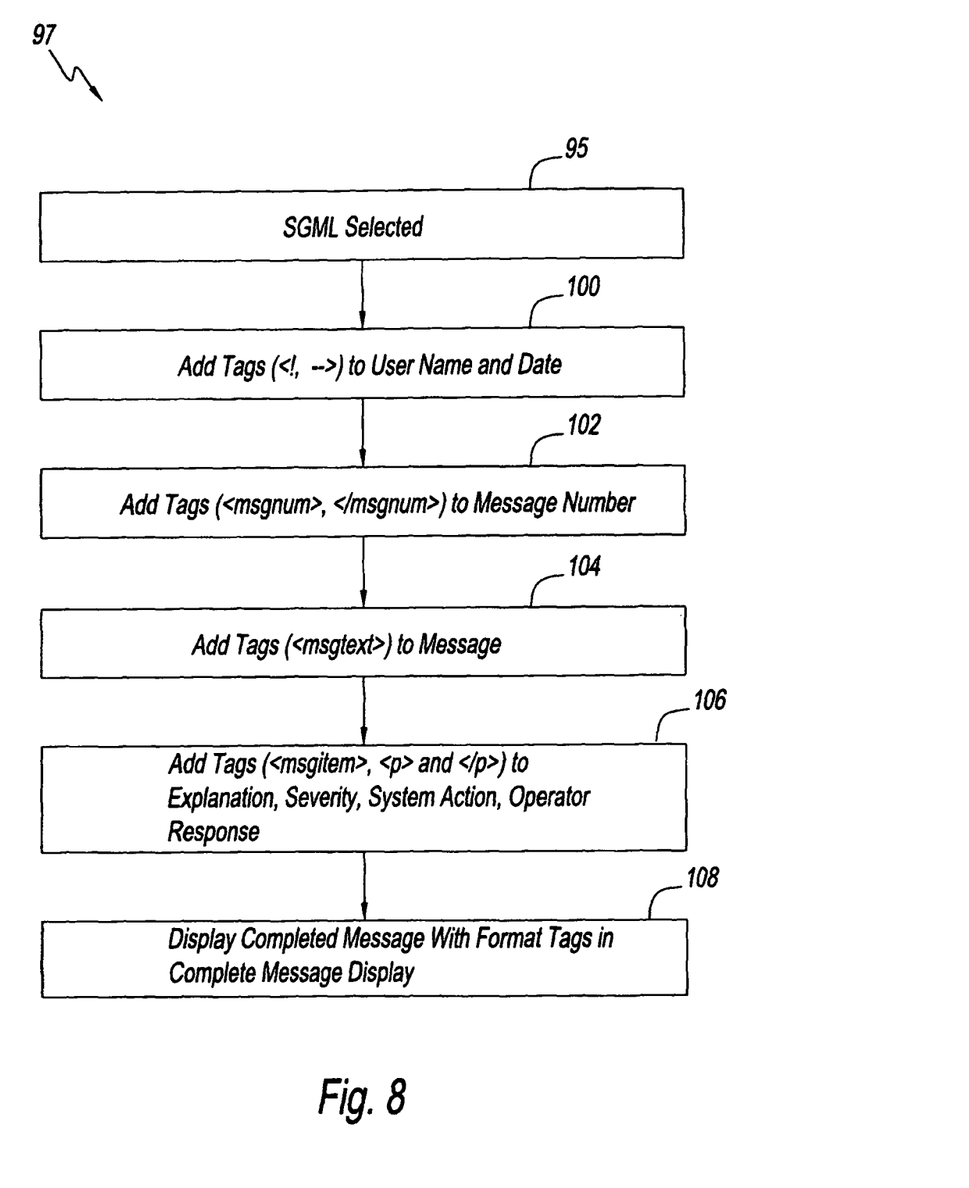
FIG. 8 is a process flow diagram of the format conversion step of the FIG. 2 process.

Referring to FIG. 8, step 97 of message creator program 26 is shown in detail for the SGML message of FIGS. 3 and 4. Step 97 begins at step 100 by adding the tags <! and --> to the user name and date entered in area 64 of FIG. 3. Step 102 adds the tags <msgnum> and </msgnum> to the message number entered in area 64. Step 104 adds the tags <msgtext> and </msgtext> to the message entered in area 68. Step 106 adds the tags <msgitem><p> and </p> to the messages in areas 70, 72, 74 and 76. For example, the explanation message of area 70 is tagged as follows:

<msgitem class="explanation">

<p> Here is where the explanation of the message text would be displayed . . . (i.e., you did not enter the proper key word and the system halted)</p>

Step 106 similarly adds tags to the severity, system action and operator response messages. Step 108 causes the messages in areas 64, 66, 68, 70, 72, 74 and 76 to be displayed in concatenated form as a formatted message with format tags in complete message display area 82.

Thus, the method of the present invention allows a user to compose a computer message in one of three formats without any knowledge of the format tags for any of the formats. The user merely enters unformatted text in the areas of template 62 on web page 80, selects the format type and selects create complete message button 86. Message creator program 26 then supplies the format tags of the selected format and displays the formatted complete message in display area 82. Message creator program 26 preferably uses the Java script utility 28 to provide a Java script/HTML interface to the user. The method of the present invention eliminates the need for a computer message composer to have a special knowledge of SGML, book manager script of formatted display format tags and rules. Message creator program 26 converts unformatted messages into a concatenated complete message with format tags of the selected format. This reduces error.

The present invention having been thus described with particular reference to the preferred forms thereof, it will be obvious that various changes and modifications may be made therein without departing from the spirit and scope of the present invention as defined in the appended claims.

What is claimed is:

1. A method for composing a computer message, said method comprising the steps of:
   (a) presenting a message composition area for entry of an unformatted message into at least one text field and for entry of data into at least one selection field associated with said text field, and a message format selector for selecting an output format from a plurality of formats; and
   (b) in response to entry of an unformatted message into said message composition area and selection of one of said output formats, converting said unformatted message to form a formatted message from said text field with format tags,
   wherein said formatted message is formatted according to said one of said output formats, and
   wherein format tags are assigned to said formatted message and said formatted message is structured for display based on a selection field data from said at least one associated selection field.

2. The method of claim 1, wherein said message formats include SGML and book manager script.

3. The method of claim 2, wherein said message formats further include formatted display.

4. The method of claim 3, wherein computer instructions for steps (a) and (b) are implemented in Java script.

5. The method of claim 3, wherein said unformatted message is a first unformatted message, said formatted message is a first formatted message, said message composition area further includes a formatted display area and wherein step (a) further presents a second message composition area; further comprising:
   (c) in response to entry of a second unformatted message into said second message composition area, converting said unformatted message to form a formatted message with format tags of said one of said output formats; and
   (d) presenting said first and second formatted messages as a concatenated complete message for display in said formatted message display area.

6. The method of claim 5, further comprising:
   (e) editing said first and second formatted messages in said formatted message display area, if needed; and
   (f) sending a copy of said formatted message to a computer message file.

7. The method of claim 6, wherein said first and second composition areas and said formatted message display area are formed in a template that is presented on a web page, and wherein steps (e) and (f) are performed via said web page.

8. A computer comprising:
   a web page for presentation on an Intranet or an Internet; and
   a message creator program for the composition of computer messages, said message creator program performing the following steps:
   (a) presenting a message composition area for entry of an unformatted message into at least one text field and for entry of data into at least one selection field associated with said text field, and a message format selector for selecting an output format from a plurality of formats; and
   (b) in response to entry of an unformatted message into said message composition area and selection of one of said output formats, converting said unformatted message to form a formatted message from said text field with format tags,
   wherein said formatted message is formatted according to said one of said output formats, and
   wherein format tags are assigned to said formatted message and said formatted message is structured for display based on a selection field data from said at least one associated selection field.

9. The computer of claim 8, wherein said message formats include SGML and book manager script.

10. The computer of claim 9 wherein said message formats further include formatted display.

11. The computer of claim 10, wherein computer instructions for steps (a) and (b) are implemented in Java script.

12. The computer of claim 10, wherein said unformatted message is a first unformatted message, said formatted message is a first formatted message and said message composition area includes a formatted message display area, and wherein step (a) further presents a second message composition area, and wherein said message creator program further comprises:
   (d) in response to entry of a second unformatted textual message in said second message composition area, converting said second unformatted message into said selected one of said formats to form a second formatted message; and
   (e) presenting said first and second formatted messages as a concatenated complete message for display in said formatted message display area.

13. A memory media for a computer, said memory media comprising:
   a controller for controlling said computer with a message creator program that performs the following steps:
   (a) presenting a message composition area for entry of an unformatted message into at least one text field and for entry of data into at least one selection field associated with said text field, and a message format selector for selecting an output format from a plurality of formats; and
   (b) in response to entry of said unformatted message into said message composition area and selection of one of said output formats, converting said unformatted message to form a formatted message from said text field with format tags,
   wherein said formatted message is formatted according to said one of said output formats, and
   wherein format tags are assigned to said formatted message and said formatted message is structured for display based on a selection field data from said at least one associated selection field.

14. The memory media of claim 13, wherein said message formats include SGML and book manager script.

15. The memory media of claim 14 wherein said message formats further include formatted display.

16. The memory media of claim 14, wherein computer instructions for steps (a) and (b) are implemented in Java script.

17. The memory media of claim 16, wherein said unformatted message is a first unformatted message, said formatted message is a first formatted message, said message composition area includes a formatted message display area and wherein step (a) further presents a second message composition area, and wherein said message creator program further comprises:
(c) in response to entry of a second unformatted textual message in said second message composition area, converting said second unformatted message into said selected one of said formats to form a second formatted message; and
(d) presenting said first and second formatted messages as a concatenated complete message for display in said formatted message display area.

18. A method for composing a computer message, said method comprising the steps of:
(a) presenting a message composition area for entry of an unformatted message into at least one text field and for entry of data into at least one selection field associated with said text field, a formatted message display area and a message format selector for selecting an output format from a plurality of formats;
(b) in response to entry of an unformatted message into said message composition area and selection of one of said output formats, converting said unformatted message to form a formatted message with format tags,
wherein said formatted message is formatted according to said one of said output formats, and
wherein format tags are assigned to said formatted message and said formatted message is structured for display based on a selection field data from said at least one associated selection field; and
(c) presenting said formatted message for display in said formatted message display area.

19. A method for composing a computer message, said method comprising the steps of:
(a) receiving an unformatted message from a user;
(b) selecting one output format for said message from a plurality of output formats;
(b.2) inputting a selection field data into an associated selection field; and
(c) converting said unformatted message to a formatted message having an output format selected in step b) and including format tags of said one of said output formats,
wherein said formatted message is formatted according to one of said output formats, and
wherein format tags are assigned to said formatted message and said formatted message is structured for display based on said selection field data from said associated selection field.

20. The method as recited in claim 19, further comprising the added step of:
(d) displaying said formatted message for user review.

21. A memory media controlling a computer to compose a computer message, said memory media comprising:
(a) a controller for controlling said computer to receive an unformatted message from a user;
(b) a selector responsive to a user input to control said computer to select one output format for said message from a plurality of output formats and an input for inputting a selection field data into an associated selection field; and
(c) a convertor for controlling said computer to convert said unformatted message to a formatted message having an output format selected in step b) and including format tags of said one of said output formats,
wherein said formatted message is formatted according to one of said output formats, and
wherein format tags are assigned to said formatted message and said formatted message is structured for display based on said selection field data from said associated selection field.

22. The memory media as recited in claim 21, further comprising:
(d) a display control for controlling said computer to display said formatted message for user review.

23. A method for composing a computer message, said method comprising the steps of:
(a) presenting a first message composition area for entry of an unformatted plain text message and a message format selector for selecting an output format from a plurality of message formats, wherein said message formats further include a first formatted display and wherein step (a) further presents a second message composition area;
(b) in response to entry of said unformatted plain text message into said first message composition area and a selection of one of said output formats, converting said unformatted plain text message to form a formatted message with format tags of said one of said output formats, wherein said unformatted plain text message is a first unformatted plain text message, said formatted message is a first formatted message, said first message composition area further includes a formatted display area;
(c) in response to an entry of a second unformatted plain text message into said second message composition area, converting said first unformatted plain text message to form a first formatted message with format tags of said one of said output formats and a second unformatted plain text message to form a second formatted message with format tags of said one of said output formats; and
(d) presenting said first and second formatted messages as a concatenated complete single message for display in said formatted message display area.

24. A computer comprising:
a web page for presentation on an Intranet or an Internet;
a message creator program for the composition of computer messages, said message creator program performing the following steps:
(a) presenting a first message composition area for entry of an unformatted plain text message and a message format selector for selecting an output format from a plurality of message formats wherein said message formats further include a first formatted display and wherein step (a) further presents a second message composition area;
(b) in response to entry of said unformatted plain text message into said first message composition area and a selection of one of said output formats, converting said unformatted plain text message to form a formatted message with format tags of said one of said output formats, wherein said unformatted plain text message is a first unformatted massage, said formatted message is a first formatted message, said first message composition area further includes a formatted display area;
(c) in response to an entry of a second unformatted plain text message into said second message composition area, converting said first unformatted plain text message to form a first formatted message with format tags of one of said output formats and a second unformatted plain text message to form a second formatted message with format tags of said one of said output formats; and (d) presenting said first and second formatted messages as a concatenated complete single message for display in said formatted message display area.

25. A memory media for a computer, said memory media comprising:

a controller for controlling said computer with a message creator program that performs the following steps:

(a) presenting a first message composition area for entry of an unformatted plain text message and a message format selector for selecting an output format from a plurality of message formats wherein said message formats further include a first formatted display and wherein step (a) further presents a second message composition area;

(b) in response to entry of said unformatted plain text message into said first message composition area and a selection of one of said output formats, converting said unformatted plain text message to form a formatted message with format tags of said one of said output formats, wherein said unformatted plain text message is a first unformatted massage, said formatted message is a first formatted message, said first message composition area further includes a formatted display area;

(c) in response to an entry of a second unformatted plain text message into said second message composition area, converting said first unformatted plain text message to form a first formatted message with format tags of one of said output formats and a second unformatted plain text message to form a second formatted message with format tags of said one of said output formats; and (d) presenting said first and second formatted messages as a concatenated complete single message for display in said formatted message display area.

26. A method for composing a computer message, said method comprising the steps of:

(a) presenting a first message composition area for entry of an unformatted plain text message and a message format selector for selecting an output format from a plurality of message formats wherein said message formats further include a first formatted display and wherein step (a) further presents a second message composition area;

(b) in response to entry of said unformatted plain text message into said first message composition area and a selection of one of said output formats, converting said unformatted plain text message to form a formatted message with format tags of said one of said output formats, wherein said unformatted plain text message is a first unformatted plain text message, said formatted message is a first formatted message, said first message composition area further includes a formatted display area;

(c) converting said first unformatted plain text message to form a first formatted message with format tags of one of said output formats and a second unformatted plain text message to form a second formatted message with format tags of said one of said output formats; and (d) presenting said first and second formatted messages as a concatenated complete single message for display in said formatted display area.

27. A method for composing a computer message, said method comprising the steps of:

(a) receiving an unformatted plain text message from a user;

(b) presenting a first message composition area for entry of an unformatted plain text message and a message format selector for selecting an output format from a plurality of message formats wherein said message formats further include a first formatted display and wherein step (b) further presents a second message composition area;

(c) converting said unformatted plain text message to form a formatted message with format tags of said one of said output formats, wherein said unformatted plain text message is a first unformatted massage, said formatted message is a first formatted message, said first message composition area further includes a formatted display area;

(d) in response to an entry of a second unformatted plain text message into said second message composition area, converting said first unformatted plain text message to form a first formatted message with format tags of one of said output formats and a second unformatted plain text message to form a second formatted message with format tags of said one of said output formats; and (e) presenting said first and second formatted messages as a concatenated complete single message for display in said formatted message display area.

* * * * *